United States Patent
Bednarchik et al.

(10) Patent No.: US 6,427,465 B1
(45) Date of Patent: Aug. 6, 2002

(54) COMPRESSOR CONTROL SYSTEM AND METHOD

(75) Inventors: John H. Bednarchik, Farmington Hills; Edwin J. Stanke, Bloomfield; John M. Cole, Shelby Township, all of MI (US)

(73) Assignee: General Motors Corporatoin, Detroit, MI (US)

( * ) Notice: Subject to any disclaimer, the term of this patent is extended or adjusted under 35 U.S.C. 154(b) by 0 days.

(21) Appl. No.: 09/627,485

(22) Filed: Jul. 28, 2000

Related U.S. Application Data

(60) Provisional application No. 60/203,285, filed on May 11, 2000.

(51) Int. Cl.$^7$ ................................................. B60H 3/00
(52) U.S. Cl. ........................................ 62/227; 62/209
(58) Field of Search ................................ 62/227, 228.1, 62/323.4, 209

(56) References Cited

U.S. PATENT DOCUMENTS

| | | | | |
|---|---|---|---|---|
| 5,335,514 A | * | 8/1994 | Hennessee et al. | 62/227 |
| 5,533,353 A | * | 7/1996 | Baker et al. | 62/227 |
| 6,092,380 A | * | 7/2000 | Kachur et al. | 62/227 X |

* cited by examiner

Primary Examiner—Harry B. Tanner
(74) Attorney, Agent, or Firm—Anthony Luke Simon

(57) ABSTRACT

An apparatus and system for manipulating the air temperature within an interior compartment of a vehicle, the apparatus cycles a compressor between an off and on position based upon a temperature reading of the evaporator fins positioned to cool the air of the vehicle. The system employs a control algorithm wherein the evaporator fin temperature of the evaporator determines the operational status of the compressor.

16 Claims, 5 Drawing Sheets

① Sub-cooled liquid Refrigerant. (High Pressure).
② Two-Phase Refrigerant.@ Low Pressure.
③ Super Heated Vapor @ Low Pressure.
④ High Pressure Super Heated (or Saturated) Vapor.

COMPRESSOR CONTROL SYSTEM AND METHOD

This application claims the benefit of a provisional application filed on May 11, 2000, entitled, Compressor Control System And Method, Ser. No. 60/203,285, the contents of which are incorporated herein by reference thereto.

TECHNICAL FIELD

The present invention is related to a HVAC system for use in a vehicle. In particular, the system uses a compressor control system that enhances the overall performance of the HVAC system.

BACKGROUND

Passenger comfort and fuel efficiency have set forth increasing demands on automotive heating, ventilating and air-conditioning (HVAC) systems. It is a primary goal of most HVAC systems to provide a more efficient means for providing climate control to an automobile.

In particular, the air conditioning (AC) system of an automobile utilizes a compressor that is either mechanically or electrically driven to circulate an automotive refrigerant to cool the interior passenger compartment of an automobile. Typically, the compressor is activated in response to a user demand such as a cooling request which will activate the compressor. Generally, there is no separate control of the compressor's operation other than switching it on and off.

A scroll compressor has superior noise characteristics to a piston-cylinder compressor. However, a scroll compressor's ability to control capacity is not as good. Accordingly, there is a trade-off in capacity control and noise between these two compressors.

The capacity of a scroll compressor with a control valve cannot be limited to a low enough point where evaporator core freeze can be avoided. Therefore, the compressor must be shut on and off to control capacity and evaporator core freeze.

Therefore, there is a need for a control system wherein the operation of the compressor is optimized in order to increase the overall performance of the compressor and the vehicle.

SUMMARY OF THE INVENTION

It is therefore an object of the invention to provide an improvement in the performance of a HVAC system of an automotive vehicle.

Another object is to provide a method and apparatus for supplementing and/or improving the HVAC system of an automotive vehicle.

Another object of the present invention is to link the compressor control to the temperature of the evaporator fins.

Another object of the present invention is to utilize a control algorithm resident upon a microprocessor within the HVAC control head. The control algorithm will cycle the compressor in response to the evaporator fin temperature.

BRIEF DESCRIPTION OF THE DRAWINGS

Other objects, features, advantages and details of the present invention appear, by way of example only, in the following detailed description of preferred embodiments of the invention, the detailed description referring to the drawings in which.

DESCRIPTION OF THE PREFERRED EMBODIMENTS

Figure 1:
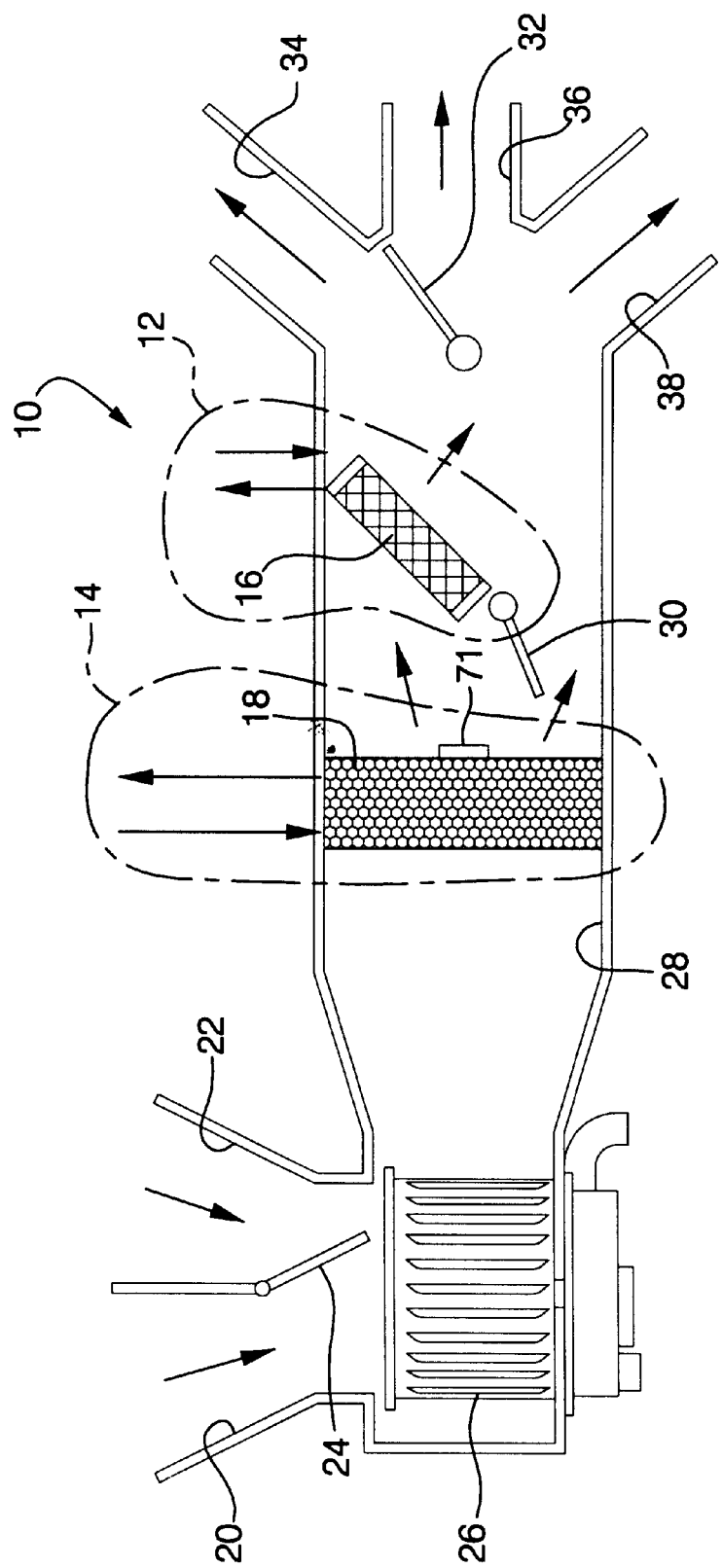
FIG. 1 is a diagrammatic view of a HVAC system.

Referring now to FIG. 1, a HVAC system 10 is illustrated. HVAC system 10 has a heating loop 12 and an air-conditioning loop 14. Generally, HVAC system 10 receives an air input from a fresh air passage 20 and a recirculation air passage 22. An air circulation door 24 controls the mixture of the fresh to recirculation air that is inputted into the system. A blower or fan 26 forces the fresh and/or recycled air into a main trunkline 28 that contains evaporator 18 and heater core 16.

Heater core 16 is positioned downstream from evaporator 18. A blend door 30 is positioned to direct the air to and/or away from heater core 16 after it has passed through evaporator 18.

A mode door 32 is positioned to direct the air or a portion thereof to a defog pathway 34, a panel pathway 36, or a floor pathway 38.

Figure 2:
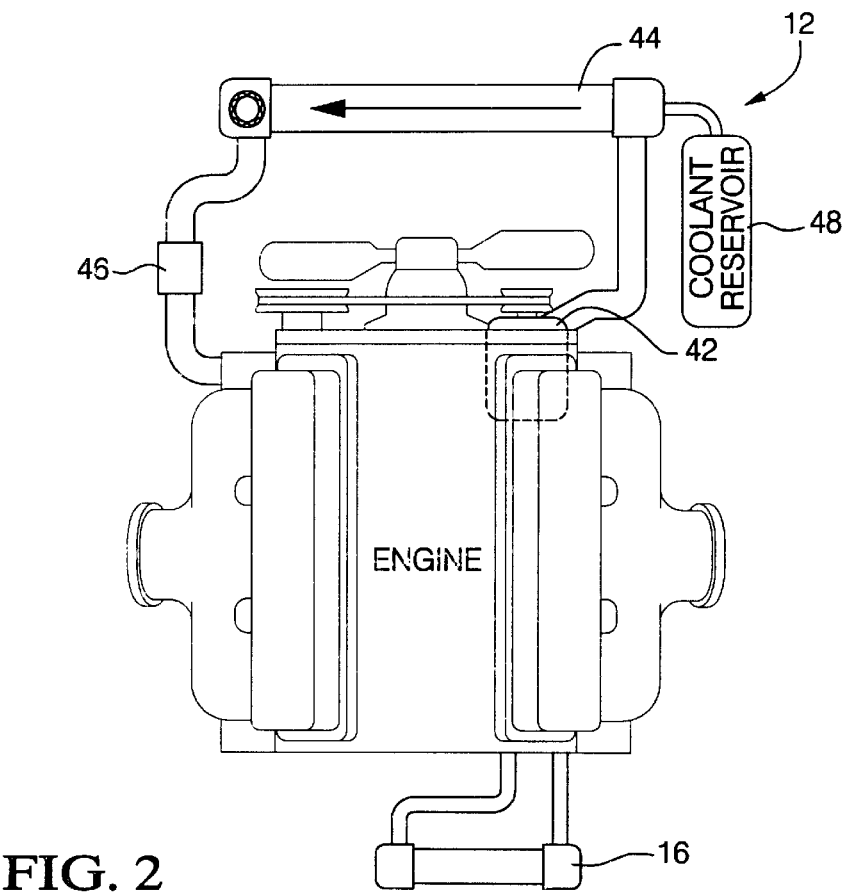
FIG. 2 is a diagrammatic view of a portion of the HVAC system illustrated in FIG. 1.

Referring now to FIG. 2, a typical heater circuit embodying heating loop 12 is illustrated. Here, an engine coolant is circulated from an engine 42 to heater core 16. Accordingly, and in order to heat the internal cabin of a vehicle, heater core 16 utilizes the heat energy generated by engine 42. In addition, a water pump 44 facilitates the movement of the engine coolant through a radiator 44 to a thermostat 46, and back to engine 42. There is also a coolant reservoir 48 for receiving and supplying coolant to radiator 44.

Figure 3:
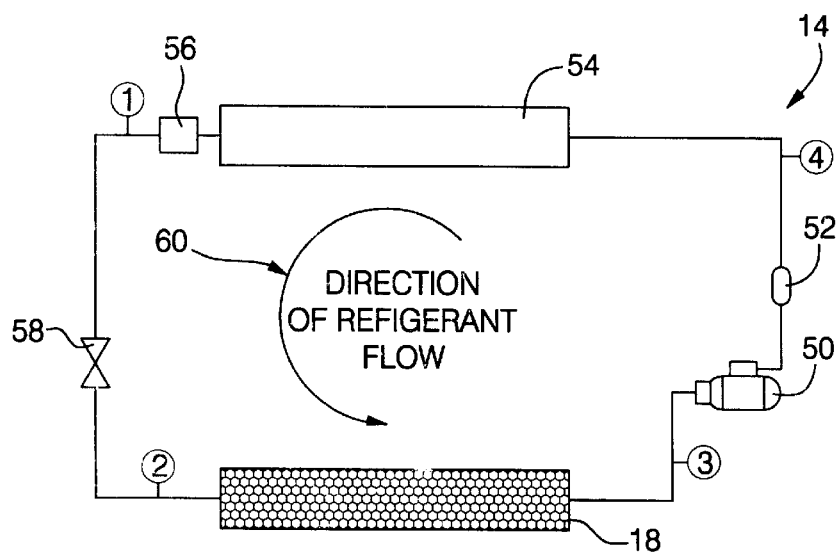
FIG. 3 is a diagrammatic view of a portion of the HVAC system illustrated in FIG. 1.

Referring now to FIG. 3, a vapor-compression refrigeration cycle embodying AC loop 14 is illustrated. AC loop 14 cools the air as it passes through trunkline 28.

The AC loop includes evaporator 18, a compressor 50, a pressure transducer 52, a condenser 54, a receiver/dehydrator 56 and a thermal expansion valve 58. A refrigerant flows in the direction of arrow 60 and condenser 54 is located in front of radiator 44 (FIG. 2). Compressor 54 is positioned intermediate to evaporator 18 and condenser 54.

An AC pressure transducer 52 is positioned intermediate to compressor 50 and condenser 54. The AC pressure transducer is typically located on the high pressure side of the AC system. This transducer can be located either at the outlet of the compressor or after the outlet of the condenser.

The AC pressure transducer is used to control the compressor in the following ways.

The AC pressure transducer is used to turn off the compressor in case of high compressor discharge pressures. This is to protect the compressor from being damaged.

The AC pressure transducer is also used to shut off the compressor in the case of low refrigerant pressures (compressor out). This is to protect the compressor from slugging. Slugging damages the compressor and produces a loud objectionable noise.

At low ambient temperatures, the AC pressure transducer is typically used as a way to allow the compressor to engage. Basing low ambient compressor engagement on AC system pressure has been found to be highly inaccurate and results in delayed compressor engagement and high customer dissatisfaction due to the loss of the ability to dehumidify HVAC inlet air. The ability to dehumidify the inlet air relates directly to the HVAC systems defog performance. It should be noted that at low ambient temperatures, the AC pressure transducer can give false readings.

At low ambient temperatures, liquid refrigerant tends to settle on the transducer itself, giving a false low-pressure reading. For example, if a vehicle sits overnight and soaks to 35° Fahrenheit, the AC system temperature and pressure stabilize to ambient conditions and the refrigerant is in a liquid state. Since the transducer is intended to measure a gas/vapor phase refrigerant, the liquid refrigerant causes a lower-than-actual pressure reading. When the vehicle is started in the morning, a false low reading will delay the engagement of the compressor since it takes longer for the system pressure to reach the level where compressor engagement is allowable. In situations like this, the ability to dehumidify inlet air is delayed until the compressor is engaged, thus causing fogging issues.

Using the compressor control algorithm of the present invention to control low ambient compressor engagement rather than the pressure transducer will prevent the aforementioned fogging issues.

A thermal expansion valve 58 is positioned intermediate to condenser 54 and evaporator 18, and receiver/dehydrator 56 is positioned intermediate to condenser 54 and thermal expansion valve 58. Receiver/dehydrator 56 provides refrigerant flow control and a means for refrigerant storage.

The refrigerant states at points 1–4 (FIG. 3) are described as follows. At point 1, the liquid refrigerant is sub-cooled and is at high-pressure. At point 2, there is a two-phase refrigerant at low-pressure. At point 3, the refrigerant is superheated vapor at low-pressure. At point 4, the refrigerant is at high-pressure and superheated (or saturated) vapor.

Compressor 50 is supplied with a mechanical operational force through the use of a clutch mechanism (not shown) that is coupled to the vehicle's drivetrain. Alternatively, compressor 50 can be driven by a pair of pulleys and a belt wherein one of the pulleys is secured to the compressor and the other is secured to the vehicle's engine or drivetrain.

Figure 4:
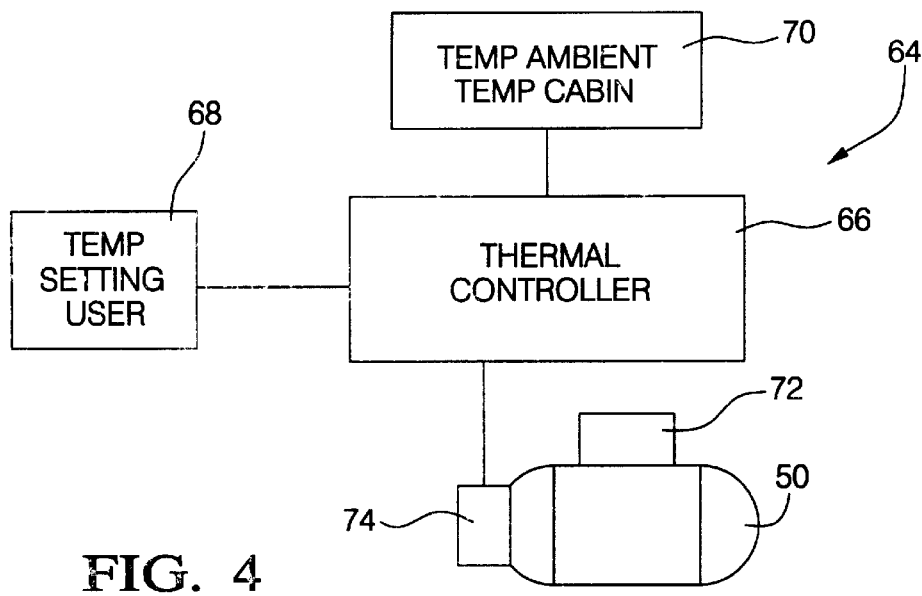
FIG. 4 is a diagrammatic view of a compressor and a compressor capacity control system.
Figure 5:
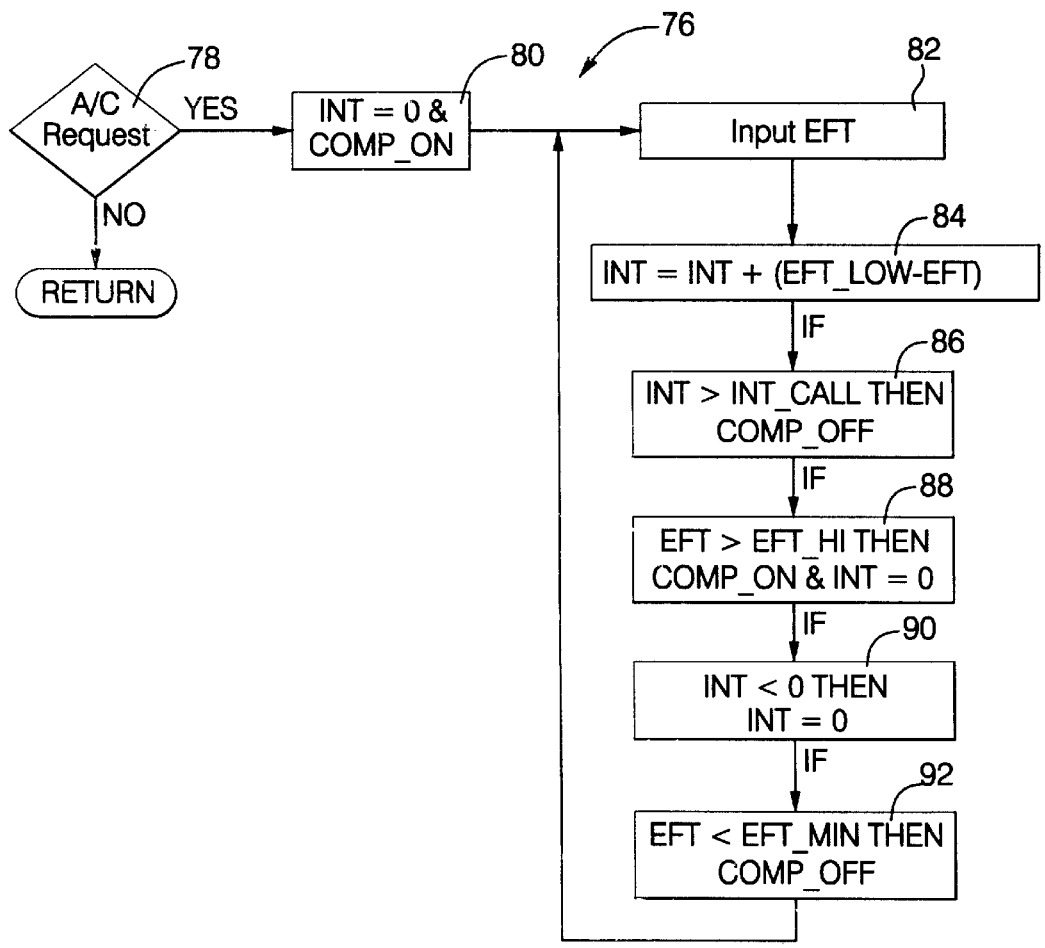
FIG. 5 is a flowchart illustrating a possible command sequence of a control algorithm for the control system illustrated in FIG. 4.

Referring now to FIGS. 4 and 5, a diagrammatic view of compressor 50 and a compressor control system 64 are illustrated. A HVAC control head 66 receives a climate control setting 68 and a system status 70. System status 70 is provided in the form of air temperature readings such as evaporator fin temperature from thermister 71, as well as cabin temperature, ambient air temperature, and the internal air temperature of the HVAC system. The aforementioned inputs in the form of air temperatures are inputted into HVAC control head 66 by a plurality of temperature sensors or thermisters 71. Thermisters 71 are appropriately located to provide the corresponding air temperature, namely, evaporator fin temperature, cabin temperature, ambient air temperature and HVAC system air temperature.

The aforementioned sensors are specific to automatic HVAC systems. The compressor control strategy of the present invention can also be applied to simpler manual HVAC systems.

The HVAC system of the instant application utilizes a Mitsubishi Heavy Industries (MHI) variable displacement scroll compressor. Of course, other compressors may be utilized with the present invention. The capacity of a scroll compressor with a control valve cannot be limited to a low enough point where a greater core freeze can be avoided. Therefore, a thermister 71 is used to determine the fin temperature of evaporator 18. This thermister is used to prevent evaporator core freeze by providing an evaporator fin temperature to a control algorithm, which cycles the compressor from on to off. The control algorithm will be resident on a microprocessor within the HVAC control head.

HVAC control head 66, in response to the climate control requests and the environmental status, determines the operational configuration and/or status of compressor 50. A compressor capacity control valve 72 is a self-regulating flow device that senses compressor suction pressure and varies capacity based on system load (based on maintaining a certain pressure differential) and a pre-set control point (a suction pressure). The set point of the control valve can be affected by manufacturing variances. These variances can cause the set point to be at extremes, or out, of allowable tolerances. When this situation occurs, the control valve is said to be at a "low-set" or "high-set" condition. The "low-set" control valve causes lower evaporator fin temperatures, thus increasing the cycling of the compressor. The compressor control strategy of the present invention will help filter out these types of manufacturing variances in the control valve as well as the evaporator fin thermister.

A clutch mechanism 74 is coupled to the vehicle's engine (not shown) through a pully and belt configuration (not shown) in order to provide a mechanical force for driving compressor 50. Clutch mechanism 74 is activated through an input received by HVAC control head 66. Alternatively, clutch mechanism 74 is manually activated through an activation switch. Alternatively, compressor 50 may be driven completely or in part by an electrical supply that is provided either by a generator and/or a battery system.

Referring now to FIG. 5, a flowchart illustrates a command sequence 76 used by controller 66 in order to vary the status of compressor 50 in response to the evaporator fin thermister output. Command sequence 76 may be performed by a computer algorithm, which receives a plurality of inputs, and in accordance with the value of these inputs, provides command requests to the automobile's HVAC system.

An initial step 78 determines whether an AC request has been made. If so, a step 80 sets a variable, defined as the evaporator temperature integral (INT), to zero and produces an output (COMP_ON), which instructs the compressor clutch to engage. A step 82 receives an input EFT, which represents the evaporator fin thermister output.

A step 84 determines the evaporator fin integral (INT) through the following formula: INT=INT+(EFT_LOW−EFT), where EFT_LOW is a constant representing the evaporator fin temperature lower threshold. In the preferred embodiment, the value of EFT LOW is 32 degrees Fahrenheit. Of course, and as applications may require, the value of EFT_LOW may vary.

A step 86 determines whether the evaporator temperature integral (INT) is greater than a constant, defined as an evaporator fin temperature integral calibration (INT_CAL). If so, an output (COMP_OFF) is sent out to instruct the compressor clutch to disengage.

A step 88 determines whether the evaporator fin thermister output (EFT) is greater than a constant representing an evaporator fin temperature at a higher threshold (EFT_HI). If so, the evaporator temperature integral (INT) is set to zero and an output (COMP_ON) instructing the compressor clutch to engage is sent out. In the preferred embodiment, the value of EFT_HI is 34 degrees Fahrenheit. Of course, and as applications may require, the value of EFT_HU may vary.

A step 90 determines whether INT is less than zero. If so, INT is reset to equal zero. This step ensures that the integration of the evaporator fin temperature integral (INT) always begins when the evaporator fin temperature is at 32 degrees Fahrenheit. For example, and referring now to step 84, if the evaporator fin temperature is 32 degrees and the evaporator fin integral INT is zero, the evaporator fin temperature integral will remain at zero. If on the other hand, the evaporator fin temperature is at 33 degrees and the evaporator fin integral INT is at zero, step 84 will set the evaporator fin integral to −1. This will be corrected by step 90, setting the integral back to zero.

By setting INT to equal 0, the integration starts at 32 degrees Fahrenheit only. If INT is less than 0, then the EFT is greater than 32 degrees and the integration is not needed. It is important to set INT=0 to make sure that INT-CAL does not become a floating variable.

A step 92 determines whether the evaporator fin thermister output (EFT) is less than a constant representing an evaporator fin temperature minimum threshold (EFT_MIN). If so, an output (COMP_OFF) instructing the compressor clutch to disengage is sent out. In the preferred embodiment, the value of EFT_MIN is 25 degrees Fahrenheit. Of course, and as applications may require, the value of EFT_MIN may vary.

Once completed, the analysis process of command sequence 76 begins again.

The control algorithm of the instant application prevents the evaporator core from freezing by controlling the cycling of the compressor. In addition, the control algorithm also minimizes the cycling of the compressor. The algorithm will be resident upon the microprocessor within the HVAC control head.

By reducing the compressor clutch cycling, an inherent increase in the quality and reliability of the compressor is obtained. The quality and reliability enhancements will also increase durability. Reducing the cycling rate, as well as the cycle time, enhances customer satisfaction by reducing the AC vent discharge temperature swing during a compressor cycle. A lower cycling rate also reduces annoyances due to the sound and tacit feel of compressor clutch engagement.

The integral feature of this algorithm results in performance enhancement at lower ambient temperatures. The algorithm of the instant application allows the compressor to remain on in applications where the temperature output of thermister 71 located on evaporator 18 is less than 32 degrees Fahrenheit. Prior systems immediately shut down the compressor when the temperature of the evaporator fin reached 32 degrees or when the AC pressure transducer shut the system off due to low compressor outlet pressure.

Accordingly, this algorithm allows the compressor to run for longer periods of time at lower ambient temperatures, while also controlling the evaporator core freeze. In addition, and since the compressor is allowed to stay engaged for a longer period of time, there are added dehumidification benefits such as improved windshield and side window defogging. This is due to the dehumidification of cool moist air by the evaporator while the compressor is allowed to run at lower ambient temperature conditions.

Since the control algorithm does not allow the compressor to be controlled by variances in the air-conditioning pressure transducer or evaporator fin thermister, sensor/valve/transducer and compressor control valve manufacturing variances are accordingly filtered out by the control algorithm of the instant application.

The integral feature of this algorithm also allows the compressor to pull down for a longer period of time without having to cycle on and off, thereby enhancing AC soak and cool down performance.

In applications where the vehicle is not equipped with the control algorithm of the instant application, and the compressor control valve and/or evaporator fin thermister manufacturing variances are not within, or are at the extremes of the allowable manufacturing tolerances, an excessive compressor cycling rate is exhibited. For example, a "low set" compressor control valve produces lower evaporator fin temperatures. This variance, coupled with a "high set" evaporator fin thermister, allows for excessive compressor cycling in applications where the vehicle is not equipped with the control algorithm of the instant application. The integral feature of this control algorithm filters out these variances and reduces the cycling rate.

By using the compressor control algorithm, the AC pressure transducer is no longer needed for low ambient compressor engagement. The AC pressure transducer low-pressure on/off calibration values are now lowered to a point so that it acts as a low refrigerant charge protection only. Low refrigerant charges cause high compressor discharge temperatures which can damage the compressor. Therefore, the compressor control algorithm benefits the AC system performance by allowing the compressor to engage more consistently and accurately at low ambient temperatures, thus improving low ambient inlet air dehumidification and HVAC system defog/defrost performance.

Accordingly, and when the control valve is controlling capacity to a minimum, there is no separate control of the compressor's operation other than switching it on and off, which in some applications is directly proportional to the temperature rating of a thermister positioned in the fins of the evaporator.

Figure 6:
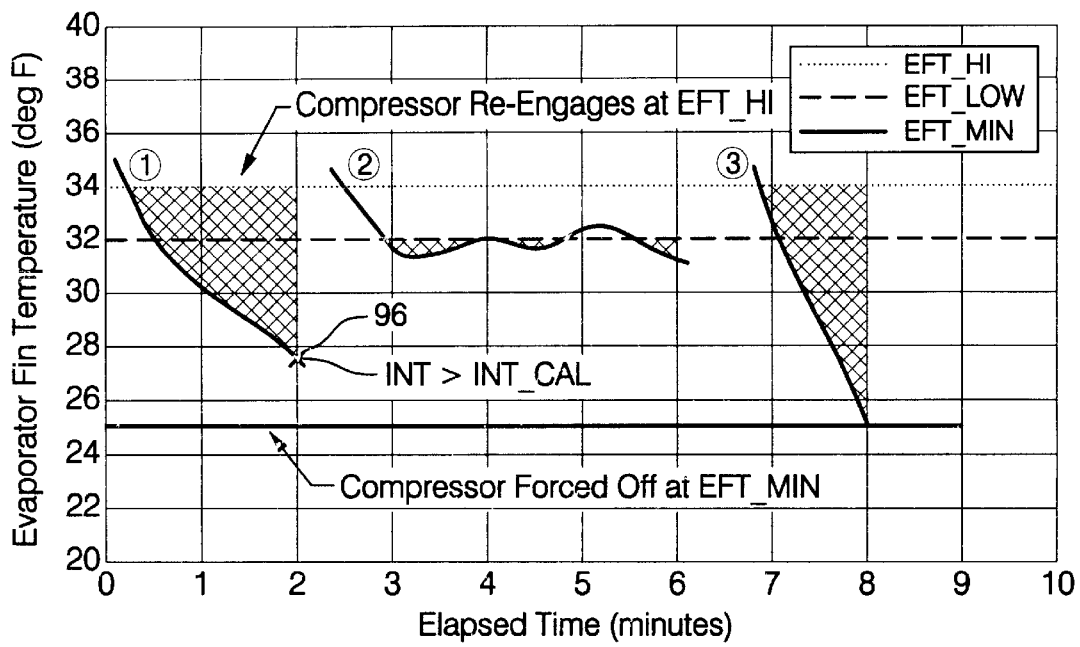
FIG. 6 is a chart illustrating evaporator fin temperatures during operation.

Thus, and as illustrated in FIG. 6, the operational protocol of the instant application allows the compressor to run longer. The areas of additional compressor operation are illustrated by the hatched areas in FIG. 6, namely the area below the dashed line representing an evaporator fin temperature of 32 degrees Fahrenheit. FIG. 6 shows how the algorithm's integral capability accounts for different slopes of decreasing EFT. For example, and referring now to the slope line identified as 1, the compressor is engaged at some point at or above EFT-MIN. As the thermister fin temperature cools down to 32 degrees Fahrenheit, a HVAC system not employing the compressor control algorithm of the instant application will instruct the compressor to shut down as a freezing temperature (32 degrees Fahrenheit) has been reached.

However, and as depicted in FIG. 6, the control algorithm of the instant application allows the compressor to run longer, and the compressor shuts off in this sequence at a point where the evaporator fin temperature integral (INT) is greater than the evaporator fin temperature integral calibration INT_CAL. This is represented by point 96 in FIG. 6. When the compressor is shut off, EFT will increase. Accordingly, when EFT rises above EFT-HI (34 degrees Fahrenheit), the compressor is allowed to re-engage.

Referring now to the slope line indicated as 2. This line represents a compressor running for a longer period of time, wherein the evaporator fin temperature is around 32 degrees Fahrenheit and areas of extended compressor engagement are depicted by the hatched areas below 32 degrees Fahrenheit. This is an example of when excessive cycling would occur without the control algorithm. The integral feature allows the compressor to operate at the freeze point until INT-CAL is reached.

Referring now to the slope line indicated as 3, the compressor is run until the evaporator fin temperature lower threshold EFT_MIN has been reached. Again, the hatched areas designates the longer period of time a compressor will run utilizing the control algorithm of the instant application. EFT-MIN is a point where compressor slugging may occur. Disengaging the compressor at this value protects the compressor from attempting to compress a liquid refrigerant.

Lines 1–3 of FIG. 6 depict several of many instances in which the compressor of an automobile's HVAC system will run longer with the control algorithm of the instant application. Of course, numerous other scenarios are anticipated and those of FIG. 6 are for illustration purposes.

Figure 7:
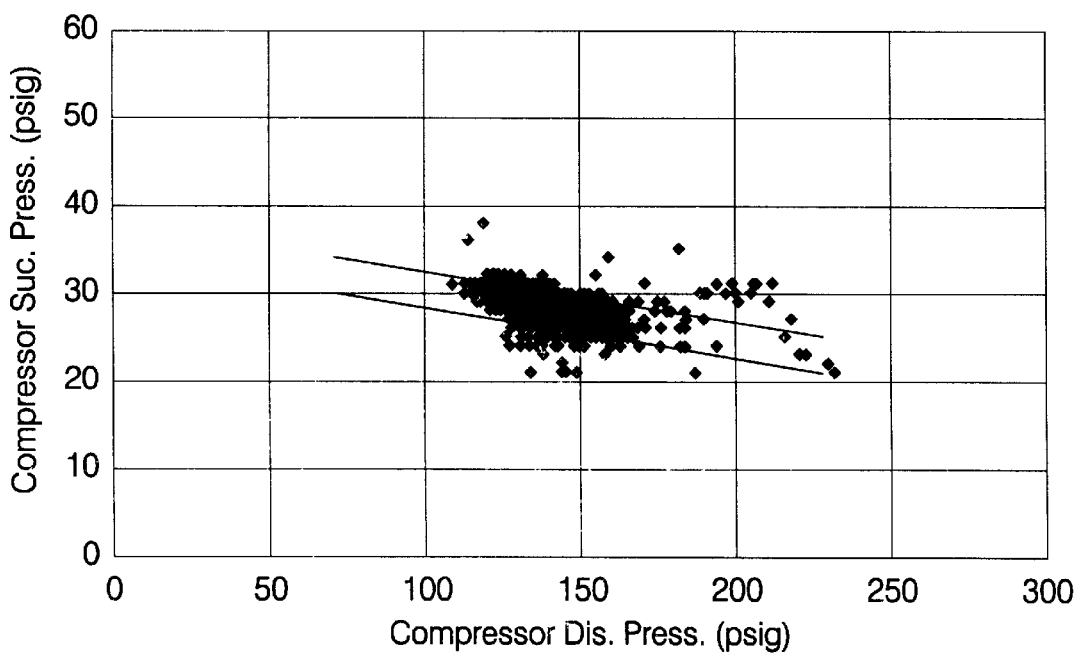
FIG. 7 is a chart illustrating compressor operating points (compressor suction pressure vs. compressor discharge pressure)
Figure 8:
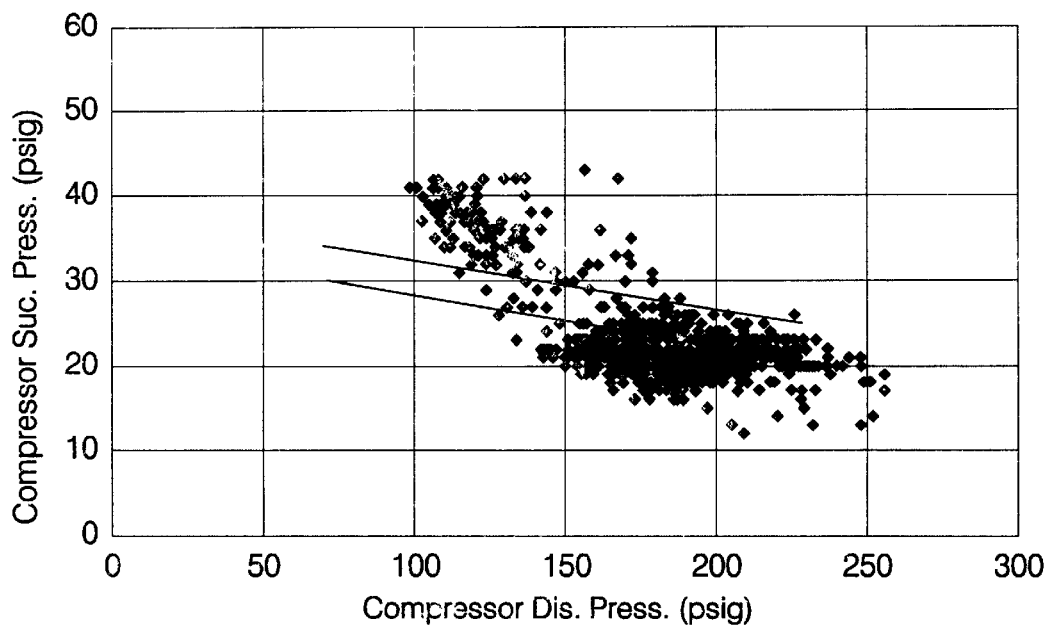
FIG. 8 is a chart illustrating compressor operating points (compressor suction pressure vs. compressor discharge pressure)
Figure 9:
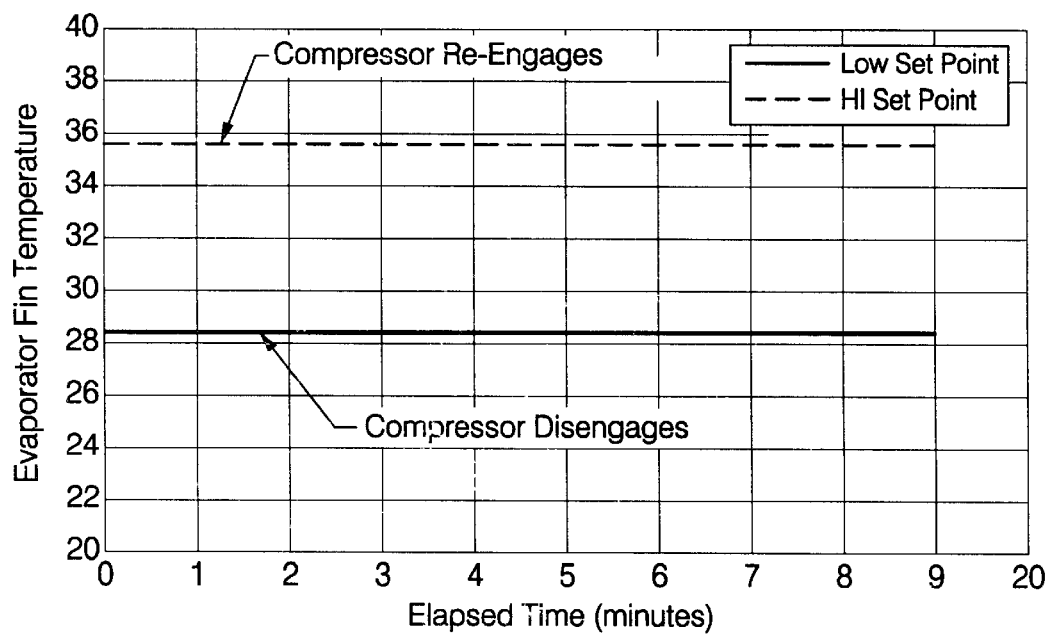
FIG. 9 illustrates a traditional compressor control operation.

Referring now to FIGS. 7 and 8, compressor-operating points are illustrated for two compressors with control valves that are in, and out, of specification. FIG. 7 shows a compressor control curve produced by a compressor with a nominal set control valve. FIG. 8 shows a compressor control curve created by a compressor with a ("low set") control valve. Manufacturing variances within the control valve cause lower operating pressures. These lower pressures relate to lower EFT. Since the EFT will be lower, more often, the compressor will cycle more frequently. The integral capacity of the control algorithm filters out the variances within the control valve, and thereby reduces cycling and prevents evaporator core freeze.

The control algorithm of the instant application filters out the manufacturing variances of the thermister and the compressor control valve, as well as the low ambient inaccuracy of the AC pressure transducer. The controlling algorithm provides for accurate control of compressor cycling rate, air conditioning outlet discharge temperatures swing, low ambient inlet air dehumidification, and evaporator core freeze.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus and system for manipulating the air temperature within an interior compartment of a vehicle, said apparatus comprising:
    a) a compressor being configured to provide a refrigerant for cooling the air temperature;
    b) a thermister for providing a fin temperature reading of an evaporator positioned to cool the air of said vehicle; and
    c) an operating system for manipulating said compressor in response to a control algorithm, said control algorithm comparing said fin temperature reading to a plurality of calibration constants to cycle said compressor on and off.

2. The apparatus and system as in claim 1, wherein said system is an automobile heating ventilating and air-conditioning (HVAC) system.

3. The apparatus and system as in claim 2, wherein said control algorithm is stored in the memory of a microprocessor for controlling said system.

4. The apparatus and system as in claim 2, wherein said plurality of calibration constants include:
    i) an evaporator fin temperature lower threshold;
    ii) an evaporator fin temperature higher threshold;
    iii) an evaporator fin temperature integral calibration constant; and
    iv) an evaporator fin temperature minimum threshold.

5. The apparatus and system as in claim 4, wherein said control algorithm defines and modifies a value of a variable, said control algorithm compares said value of said variable to said plurality of calibration constants in order to determine whether said compressor should be cycled on or off.

6. A system for manipulating the air temperature within an interior compartment of a vehicle, said apparatus comprising:
    a) a ducting system having an inlet end and an outlet end, said ducting system being configured, dimensioned and positioned to provide airflow to said interior compartment;
    b) an evaporator being positioned within said ducting system, said evaporator cooling air as it passes through said ducting system;
    c) a compressor being configured to provide a refrigerant to said evaporator for cooling the air temperature;
    d) a thermister for providing a fin temperature reading of said evaporator; and
    e) an operating system for manipulating said compressor in response to a non-cascading algorithm, said non-cascading algorithm comparing said fin temperature reading to a plurality of calibration constants to cycle said compressor on and off.

7. The system as in claim 6, wherein said non-cascading algorithm is stored in the memory of a microprocessor for controlling said system.

8. A method of controlling a compressor of a motor vehicle's HVAC system, comprising:
    defining a set point of said compressor, said set point being based upon an evaporator fin temperature and an operator selected temperature input;
    defining an evaporator fin temperature control range that serves as a clutch cycling control criterion; and
    cycling said compressor in response to said set point and the boundaries defined by said evaporator fin temperature control range.

9. A method for controlling the capacity of a compressor in a heating ventilating and air-conditioning system of a vehicle, comprising:
    inputting an air conditioning request into a control system;
    activating said compressor and setting a control integral equal to zero in response to said air conditioning request;
    inputting a system temperature to said control system;
    controlling said control system to calculate an updated control integral based upon said control integral, said system temperature, and a first control constant;

deactivating said compressor if said updated control integral is greater than a second control constant;

activating said compressor and resetting said control integral equal to zero if said system temperature is greater than a third control constant;

resetting said updated control integral equal to zero if said updated control integral is less than zero; and deactivating said compressor if said system temperature is less than a fourth control constant.

10. The method as in claim 9, wherein said first control constant is an evaporator fin temperature lower threshold, said second control constant is an evaporator fin temperature integral calibration constant, said third control constant is an evaporator fin temperature higher threshold, and said fourth control constant is an evaporator fin temperature minimum threshold.

11. The method as in claim 10, wherein said evaporator fin temperature lower threshold is about 32 degrees Fahrenheit, said evaporator fin temperature higher threshold is about 34 degrees Fahrenheit, and said evaporator fin temperature minimum threshold is about 25 degrees Fahrenheit.

12. The method as in claim 9, wherein said algorithm is stored in a microprocessor of said control system.

13. The method as in claim 12, wherein said algorithm is a non-cascading algorithm.

14. A method for operating a compressor in a heating ventilating and air-conditioning system of a vehicle, comprising:

setting an evaporator fin integral of a control algorithm for operating said heating ventilating and air-conditioning system to zero and engaging a compressor in response to an air conditioning request;

receiving an evaporator fin temperature input;

updating the value of said evaporator fin integral by subtracting said evaporator fin temperature from a first calibration constant and adding the value to said evaporator fin integral;

disengaging said compressor if the updated evaporator fin integral is greater than a second calibration constant;

setting said evaporator fin integral to zero if the updated value of said evaporator fin integral is less than zero;

setting said evaporator fin integral to zero and engaging said compressor if said evaporator fin temperature input is greater than a third calibration constant; and disengaging said compressor if said evaporator fin temperature input is less than a fourth calibration constant.

15. The method as in claim 14, wherein said first calibration constant is about 32 degrees Fahrenheit, said third calibration constant is about 34 degrees Fahrenheit and said third calibration constant is about 25 degrees Fahrenheit.

16. The method as in claim 14, wherein said control algorithm continuously operates.

* * * * *